(12) United States Patent
Kobori et al.

(10) Patent No.: US 8,244,470 B2
(45) Date of Patent: Aug. 14, 2012

(54) NAVIGATION APPARATUS

(75) Inventors: Norimasa Kobori, Toyota (JP); Kazunori Kagawa, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 774 days.

(21) Appl. No.: 12/308,942

(22) PCT Filed: Jul. 11, 2007

(86) PCT No.: PCT/IB2007/001942
§ 371 (c)(1),
(2), (4) Date: Dec. 30, 2008

(87) PCT Pub. No.: WO2008/010049
PCT Pub. Date: Jan. 24, 2008

(65) Prior Publication Data
US 2009/0271108 A1    Oct. 29, 2009

(30) Foreign Application Priority Data
Jul. 12, 2006   (JP) .................................. 2006-192048

(51) Int. Cl.
*G08G 1/123* (2006.01)
(52) U.S. Cl. .................... 701/532; 701/423; 701/500
(58) Field of Classification Search .................. None
See application file for complete search history.

(56) References Cited

U.S. PATENT DOCUMENTS

| | | | |
|---|---|---|---|
| 5,862,511 A | 1/1999 | Croyle et al. | |
| 5,902,351 A * | 5/1999 | Streit et al. | 701/220 |
| 6,025,790 A * | 2/2000 | Saneyoshi | 340/946 |
| 2003/0216865 A1* | 11/2003 | Riewe et al. | 701/220 |
| 2004/0181335 A1 | 9/2004 | Kim et al. | |
| 2005/0134440 A1* | 6/2005 | Breed | 340/435 |
| 2005/0234644 A1* | 10/2005 | Lin | 701/214 |

FOREIGN PATENT DOCUMENTS

| | | |
|---|---|---|
| EP | 1 288 623 A1 | 3/2003 |
| EP | 1 457 946 A1 | 9/2004 |
| JP | A-61-017911 | 1/1986 |
| JP | A-06-341847 | 12/1994 |
| JP | A-08-061968 | 3/1996 |
| JP | A-2000-346663 | 12/2000 |
| JP | A-2002-213979 | 7/2002 |
| JP | A-2003-214872 | 7/2003 |
| WO | WO 2007/057771 A2 | 5/2007 |

* cited by examiner

*Primary Examiner* — M. Thein
(74) *Attorney, Agent, or Firm* — Oliff & Berridge, PLC (57) ABSTRACT

A navigation apparatus that detects a position of a movable body includes map data storage means for storing map data; an autonomous sensor that detects information on behavior of the movable body; inertial position determination means for detecting an inertial position-determination position of the movable body, by accumulating the information detected by the autonomous sensor on a result of position determination performed using radio navigation; characteristic position detection means for detecting a characteristic position that is the inertial position-determination position at which the movable body has exhibited a characteristic behavior; correction amount detection means for extracting positional information on a road position corresponding to the characteristic position, by referring to the map data storage means; and position correction means for correcting the characteristic position using a Kalman filter based on a condition that the characteristic position is close to the road position.

12 Claims, 5 Drawing Sheets

NAVIGATION APPARATUS

BACKGROUND OF THE INVENTION

1. Field of the Invention

The invention relates to a navigation apparatus that detects the position of a movable body. More specifically, the invention relates to a navigation apparatus that accurately corrects the position of a movable body determined using autonomous navigation.

2. Description of the Related Art

In a navigation system, the current position of a host vehicle is accurately estimated, by determining the position of the host vehicle based on radio waves from GPS (Global Positioning System) satellites, and accumulating a travel distance and a travel direction using a vehicle-speed sensor, a gyro sensor, and the like.

However, when the navigation system cannot receive the radio waves from the GPS satellites, the error in position determination performed by autonomous navigation is amplified as the time elapses. As a result, the accuracy of the position gradually decreases.

Accordingly, various methods for correcting the position of the host vehicle determined by autonomous navigation are proposed. For example, in a map matching, the position determined by autonomous navigation is corrected using map data in a navigation system (for example refer to Japanese Patent Application Publication No. 2002-213979 (JP-A-2002-213979)). Japanese Patent Application Publication No. 2002-213979 describes a method in which a road whose position and direction most closely match the position and direction determined by autonomous navigation is selected from map data, and the determined position and direction are corrected by associating the determined position and direction with the selected road.

However, the map data in commercially-available navigation systems is not so accurate. Also, because a road network is represented by straight links that connect intersections (nodes), the road network may not match an actual road configuration. Therefore, the position of the host vehicle may not be sufficiently corrected in the map matching.

Also, a position correction method is proposed, in which the travel path of a vehicle is compared with a road pattern in map data, and the position of the vehicle is associated with a road that is close to the position of the vehicle, based on the degree of matching (for example, refer to Japanese Patent Application Publication No. 8-61968 (JP-A-8-61968)). Japanese Patent Application Publication No. 8-61968 describes a correction method in which it is detected that a host vehicle has passed an intersection or a curve based on a travel path; and map data on the intersection or the curve that matches the travel path is detected by pattern matching. Thus, the position of the host vehicle is corrected.

However, because design is made such that the links intersect each other at 90 degrees at ordinary intersections, when the travel path at an intersection is compared with the road configurations at intersections by pattern matching, the travel path matches almost all the link data relating to intersections. Accordingly, there is a possibility that the travel path matches an intersection that is completely different from the intersection that the vehicle has passed. Also, because the link data is formed by straight lines as described above, it is difficult to detect the link data that matches a curved travel path. Further, because it takes much time to perform the process of pattern matching, it is not appropriate to perform the process of pattern matching in the navigation system.

SUMMARY OF THE INVENTION

The invention provides an apparatus that more accurately determines the position of a movable body by correcting the result of position determination performed by autonomous navigation.

A first aspect of the invention relates to a navigation apparatus that detects a position of a movable body. The navigation apparatus includes map data storage means for storing map data; an autonomous sensor that detects information on behavior of the movable body; inertial position determination means for detecting an inertial position-determination position of the movable body, by accumulating the information detected by the autonomous sensor on a result of position determination performed using radio navigation; characteristic position detection means for detecting a characteristic position that is the inertial position-determination position at which the movable body has exhibited a characteristic behavior; correction amount detection means for extracting positional information on a road position corresponding to the characteristic position, by referring to the map data storage means; and position correction means for correcting the characteristic position using a Kalman filter based on the condition that the characteristic position is close to the road position. In the position determination using radio navigation, a GPS device may be used.

According to the first aspect of the invention, the position of the movable body when the movable body passes an intersection or the like is corrected using the Kalman filter so that the position of the movable body is close to a position on the map data, which corresponds to the position of the movable body. Therefore, the optimum correction is made according to the magnitude of the error of the position determined using autonomous navigation.

Thus, it is possible to provide the position determination apparatus that more accurately determines the position of the movable body by correcting the result of position determination performed using autonomous navigation.

BRIEF DESCRIPTION OF THE DRAWINGS

The above and other objects and features of the present invention will become apparent from the following description of example embodiments given in conjunction with the accompanying drawings, in which.

DETAILED DESCRIPTION OF EXAMPLE EMBODIMENTS

Figure 1:
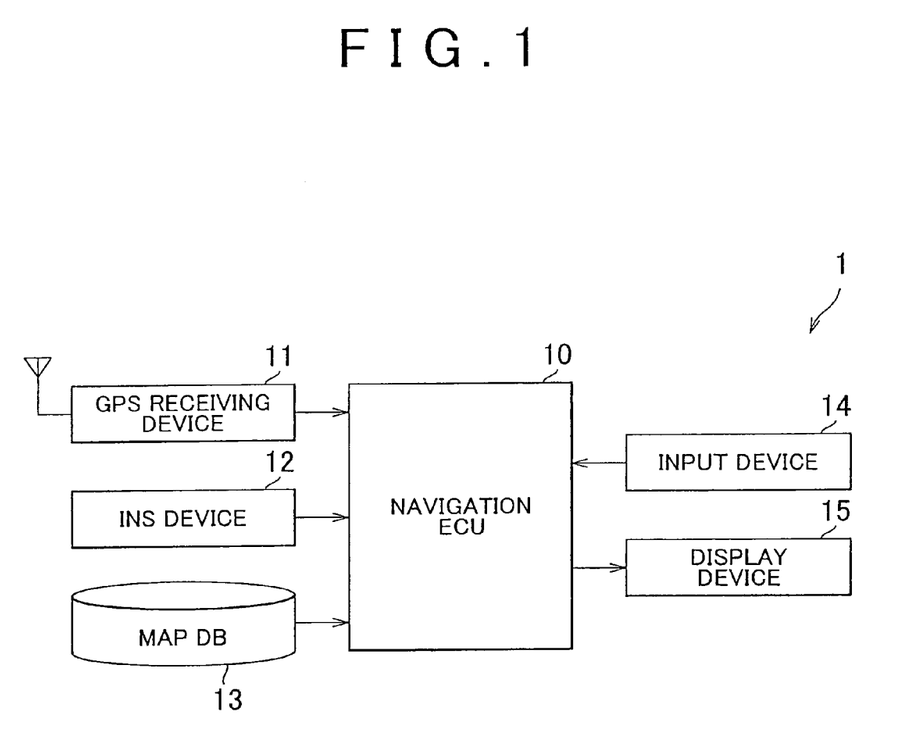
FIG. 1 is a schematic configuration diagram showing a navigation apparatus according to an embodiment of the invention.

Hereinafter, an embodiment of the invention will be described with reference to the drawings. FIG. 1 is a schematic configuration diagram showing a navigation apparatus 1 according to the embodiment of the invention. The navigation apparatus 1 according to the embodiment enables accurate position determination, by correcting the position of a vehicle determined using autonomous navigation, when it is difficult to acquire GPS (Global Positioning System) satellites, or when the reliability of the GPS position determination decreases. When GPS radio waves are blocked, the navigation apparatus 1 detects that the vehicle has passed an intersection or the like based on behavior of the vehicle, and corrects the position determined using autonomous navigation so that the determined position is close to the position of the intersection on map data, which corresponds to the position where the behavior is detected. Because the correction is made using a Kalman filter, the optimum correction is made according to the magnitude of the error of the position determined using autonomous navigation. This correction reduces the error that is accumulated each time the vehicle makes a turn to the right or left, or the like at an intersection. Therefore, even when a long time has elapsed after the GPS radio waves are blocked, it is possible to accurately perform position determination.

The navigation apparatus 1 is controlled by a navigation ECU (Electrical Control Unit) 10. The navigation ECU 10 is configured as a computer in which a CPU that executes programs, storage devices (a hard disk drive, and/or ROM) that store the programs, RAM that temporarily stores data and the programs, an input/output device to/from which data is input/output, NV-RAM (Nonvolatile-RAM), and the like are connected with each other by a bus.

The navigation ECU 10 is connected to a GPS receiving device 11 that receives radio waves from the GPS satellites; an INS (Inertial Navigation Sensor) device (an autonomous sensor) 12 that outputs a signal (INS data) in accordance with a travel distance, a travel direction, and the orientation of the vehicle defined by yaw, roll, pitch, and the like; a map database (hereinafter, referred to as "map DB") 13 that stores map data; an input device 14 that is used to operate the navigation apparatus 1; and a display device 15 that displays the current position of the vehicle on the map.

The map DB 13 is constituted by the hard disk, CD-ROM, DVD-ROM, and the like. The map DB 13 stores road map information on a road network, intersections, and the like, which is associated with the latitudes and longitudes. In the map DB 13, information relating to nodes (for example, points at which roads intersect with each other, and points at predetermined intervals from intersections), and information relating to links (i.e., roads that connect the nodes), which are associated with an actual road network, are stored in respective table databases.

The node table includes the node numbers and the coordinates of nodes, the number of links that extend from the nodes, the direction of each of the links, and the link numbers of the links. The link table includes the link numbers of the links, start nodes and end nodes that constitute the links, and the lengths of the links. The node numbers and the link numbers are set so that all of the node numbers and the link numbers are different from each other. Thus, by tracking the node numbers and the link numbers respectively, the road network is formed.

The input device 14 is constituted by a touch panel, a press-type keyboard, buttons, a remote control, a cross key, and the like. The input device 14 is an interface to which operation performed by a driver is input. The input device 14 may include a microphone, and may recognize the voice of the driver using a voice recognition circuit so that operation is input to the input device 14. When a search for a route to a destination is conducted, the driver may input the destination using an address, a geographic name, the name of a landmark, a post code, and the like.

The display device 15 is constituted by a liquid crystal display, an organic EL display, a HUD (Head Up Display), or the like. The display device 15 displays a road map showing an area around the host vehicle, or a road map showing a designated area on a designated scale. In addition, the display device 15 displays the position of the host vehicle, the route to the destination, and the like on the road map, as needed. The display device 15 includes a speaker, and gives voice guidance based on the orientation of the vehicle along the route using the speaker, for example, at an intersection at which the vehicle turns to the right or left.

Figure 2:
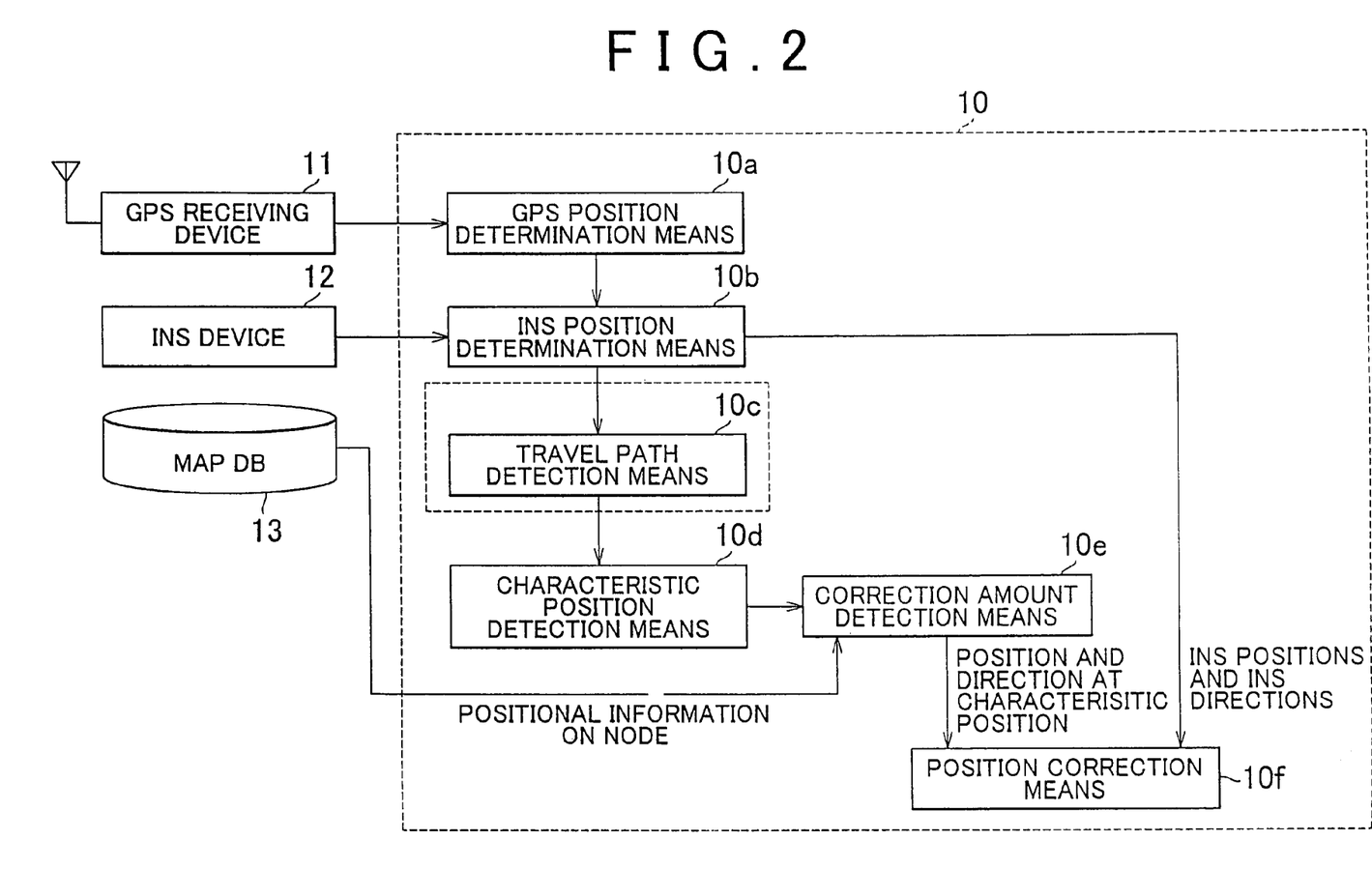
FIG. 2 is a function block diagram of a navigation ECU.

The CPU of the navigation ECU 10 performs position determination as described in the embodiment, by executing a program stored in the storage device. FIG. 2 is a function block diagram of the navigation ECU 10.

The navigation ECU 10 includes GPS position determination means 10a for determining the position of the host vehicle using radio navigation (GPS in the embodiment); INS position determination means 10b for determining the position of the host vehicle using the INS data and autonomous navigation; travel path detection means 10c for detecting a travel path obtained by position determination performed by the GPS position determination means 10a or the INS position determination means 10b; characteristic position detection means 10d for detecting a characteristic position such as an intersection, based on behavior of the host vehicle; correction amount detection means 10e for extracting positional information on a node corresponding to the characteristic position such as the intersection, from the map DB 13; and position correction means 10f for correcting the characteristic position so that the characteristic position is close to the position of the intersection on the map data using the Kalman filter. Hereinafter, detailed description will be made.

The GPS position determination means 10a determines the position of the host vehicle, based on the radio waves from the GPS satellites, using a known method. The GPS position determination means 10a calculates distances from the host vehicle to the GPS satellites, based on times required for the radio waves transmitted from the plurality of GPS satellites to reach the GPS receiving device 11. Then, the GPS position determination means 10a determines an intersection of three hyperboloids defined using the loci of the distances from the respective three GPS satellites to the host vehicle, as the position of the host vehicle. When the GPS position determination means 10a receives the GPS radio waves, the GPS position determination means 10a determines the position of the host vehicle at predetermined time intervals.

When the GPS radio waves are blocked, the INS position determination means 10b detects a vehicle speed, a steering angle, and the travel direction, using the INS device 12. Then, the INS position determination means 10b accumulates the travel distance and direction on the position and direction that have been determined so far. Thus, the INS position determination means 10b detects the position and direction using autonomous navigation (hereinafter, these position and direction will be referred to as "INS position" and "INS direction", respectively).

Figure 3A:
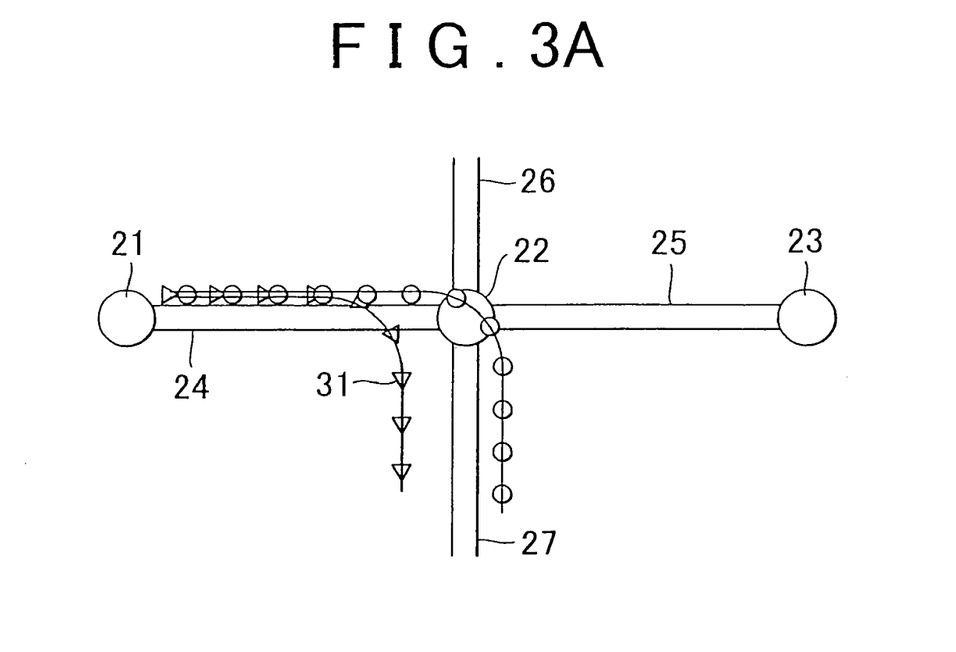
FIGS. 3A and 3B are diagrams showing the relation between INS positions detected using autonomous navigation, and rinks and nodes.

FIG. 3A is a diagram showing the relation between the INS positions detected using autonomous navigation, and the links and nodes. In FIG. 3A, the GPS radio waves have already been blocked. The host vehicle has traveled on the link 24 in the direction from the node 21 to the node 22, and has turned to the right at the node 22. The triangles show the INS positions of the host vehicle detected using autonomous navigation. The circles show the actual positions of the host vehicle, for comparison. The links and nodes, which are close to the INS positions and INS directions, are extracted from the map DB 13. As shown in FIG. 3A, the INS positions slightly differ from the actual positions, and the INS directions slightly differ from the actual directions.

The error variance of the INS position is necessary to employ the Kalman filter. The error of the signal from the INS device 12 is known in accordance with the vehicle velocity, a GPS radio wave blocking time, and the like. Therefore, the variance of the error of the INS position accumulated based on the vehicle velocity, the GPS radio wave blocking time, and the like, is also known.

The characteristic position detection means 10*d* detects the characteristic position as a position at which the host vehicle has exhibited a characteristic behavior. The characteristic behavior is a behavior exhibited at an intersection, a T-shaped intersection, and the like, that is, a behavior in which the travel direction changes in a short time, for example, a behavior in which the travel direction changes by approximately 90 degrees or more, such as the behavior of turning to the right or left, or the behavior of turning around.

The characteristic position detection means 10*d* detects that the vehicle has exhibited a characteristic behavior, for example, when it is detected that a yaw rate is equal to or larger than a predetermined value while the turn signal of the vehicle is flashing (i.e., the direction indicator is operated). When the turn signal is flashing, it is predicted that the travel direction will relatively greatly change to the right or left. When it is detected that the yaw rate is equal to or larger than the predetermined value, it is detected that the travel direction has actually changed. In FIG. 3A, the characteristic position 31 is a position at which the characteristic position detection means 10*d* has detected characteristic movement.

The characteristic position 31 may be determined based on the travel path. In this case, before the characteristic position detection means 10*d* detects the characteristic position, the travel path detection means 10*c* detects the travel path. The travel path detection means 10*c* obtains the travel directions at predetermined intervals (for example, at intervals of 2 m) from the INS device 12.

When the host vehicle has traveled on a characteristic travel path, the characteristic position detection means 10*d* detects that the host vehicle has traveled on the characteristic travel path based on a direction change amount $\Delta\theta$ calculated from the travel directions at the predetermined intervals, which constitute the travel path. If the vehicle travels for a long time, the direction change amount may gradually become 90 degrees or more. Therefore, the characteristic position detection means 10*d* detects that the host vehicle has traveled on a characteristic travel path when it is detected that the direction change amount is approximately 90 degrees or more within a predetermined travel distance.

When the characteristic position is detected, the correction amount detection means 10*e* extracts the positional information on the node corresponding to the characteristic position, from the map DB 13. The node corresponding to the characteristic position is, for example, the node closest to the characteristic position.

Figure 3B:
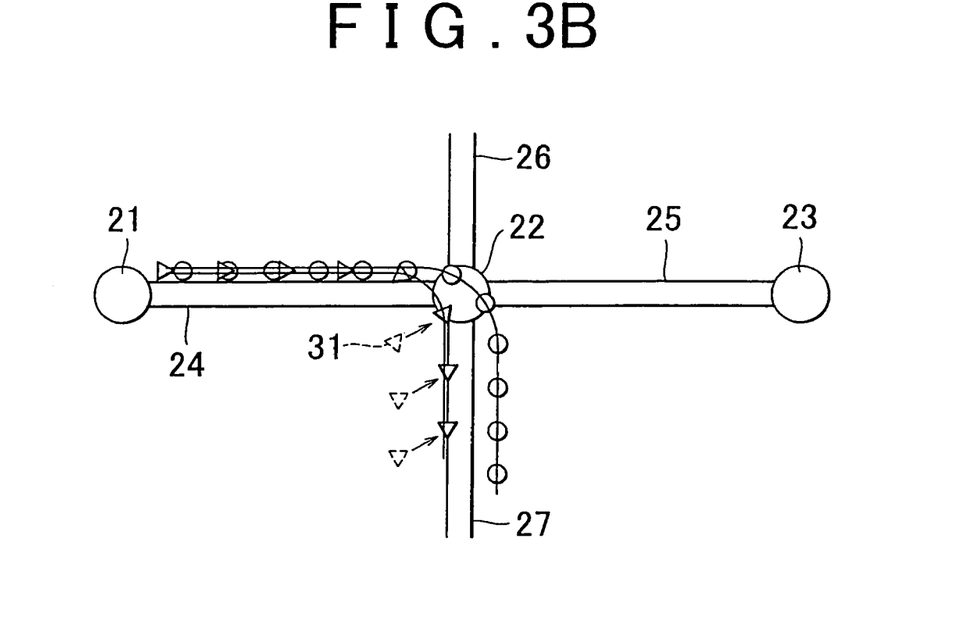

When the positional information on the node corresponding to the characteristic position 31 (the node 22 in FIG. 3) is extracted, the distance and direction between the position of the node 22 and the characteristic position 31 are detected. However, ideally, the node 22 should match the characteristic position 31.

Accordingly, the navigation apparatus 1 according to the embodiment corrects the INS positions so that the characteristic position 31 is close to the node 22. That is, an observation equation is set on the condition that "the characteristic position 31 is close to the intersection", and the INS positions are corrected using the Kalman filter.

The correction amount detection means 10*e* delivers the positional information on the characteristic position 31 (the INS position), a distance "d" between the position of the node 22 and the characteristic position 31, and a direction $\alpha$ between the position of the node 22 and the characteristic position 31, to the position correction means 10*f*. These are observation amounts input to the Kalman filter.

FIG. 3B shows the relation between the INS positions, and the links and nodes when the characteristic position 31 is made close to the position of the node 22. The position correction means 10*f* corrects the characteristic position 31 so that the distance "d" between the position of the node 22 and the characteristic position 31 is zero, using the Kalman filter. Using the Kalman filter, it is possible to make the correction to reduce the distance "d" to zero even when the distance "d" is large, and it is possible to make the correction according to the error of the INS position even when the error of the INS position is large. Thus, the characteristic position 31 is corrected to the most probable position.

The INS positions and INS directions ahead of, and behind the characteristic position 31, which are determined by the INS position determination means 10*b*, are input to the position correction means 10*f*. Therefore, the INS positions and INS directions ahead of, and behind the characteristic position 31 are also corrected by the same correction amount as the amount by which the characteristic position 31 is corrected, and in the same direction as the direction in which characteristic position 31 is corrected. In FIG. 3B, because the characteristic position 31 is made close to the position of the node 22, the INS positions ahead of, and behind the characteristic position 31 are corrected by the same distance as the distance by which the characteristic position 31 is corrected, and in the same direction as the direction in which the characteristic position 31 is corrected.

Figure 4:
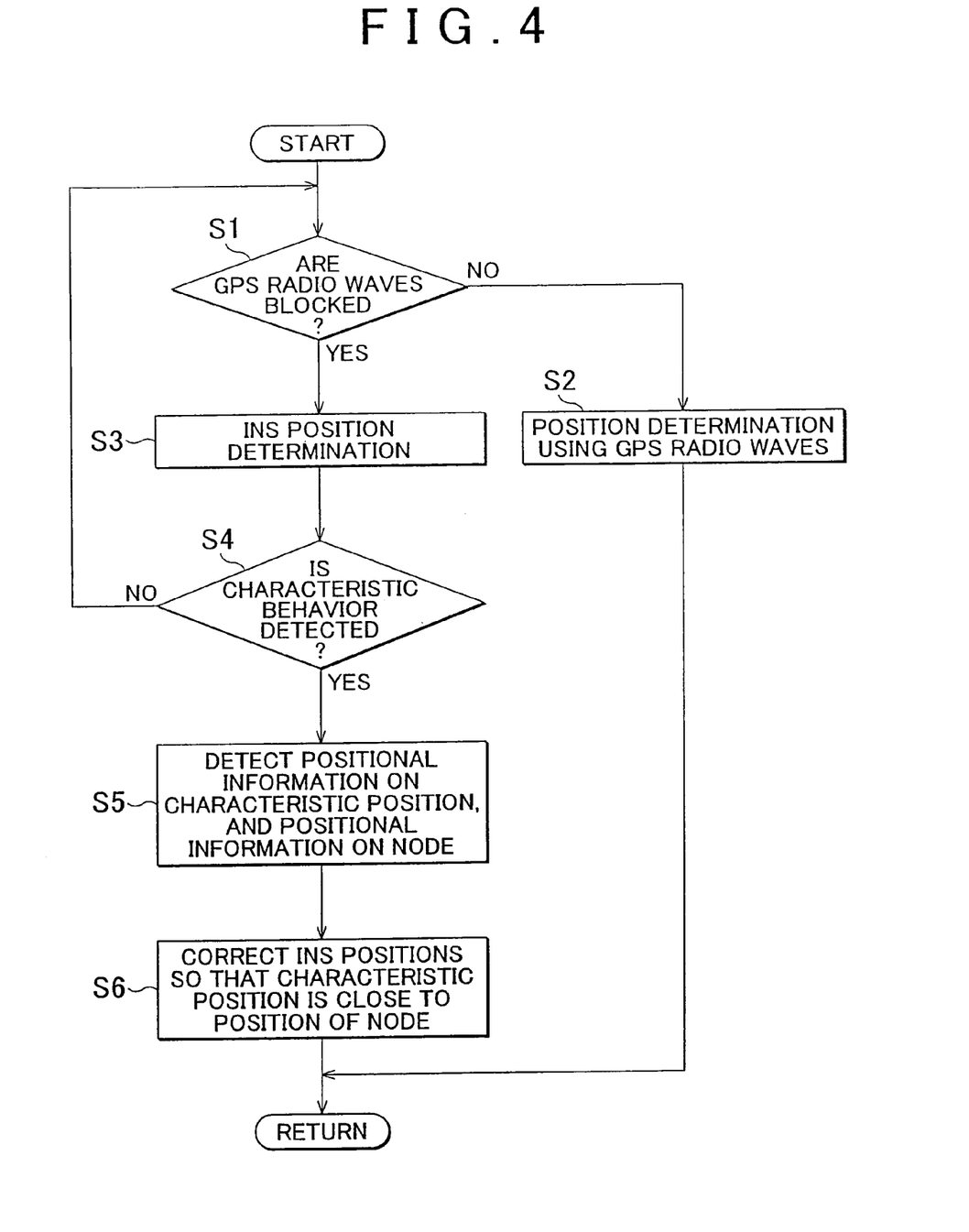
FIG. 4 is a flowchart showing processes executed by the navigation apparatus for correcting the position of a host vehicle using a characteristic position.

FIG. 4 is a flowchart showing the processes executed by the navigation apparatus 1 for correcting the position of the host vehicle determined by autonomous navigation, using the characteristic position.

The GPS position determination means 10*a* determines whether the GPS radio waves are blocked at time intervals at which the position of the host vehicle is determined (S1). When it is determined that the GPS radio waves are not blocked (NO in S1), the position determined using the GPS radio waves is the position of the host vehicle (S2).

When it is determined that the GPS radio waves are blocked (YES in S1), the INS position determination means 10*b* detects the INS position and the INS direction using autonomous navigation, by accumulating the travel distance detected by the vehicle-speed sensor, and the travel direction obtained from the INS device 12, on the position and direction determined using GPS (S3).

After the INS position and INS direction are detected, the characteristic position detection means 10*d* determines whether the host vehicle has exhibited a characteristic behavior (S4). That is, for example, the characteristic position detection means 10*d* determines whether it is detected that the yaw rate is equal to or larger than the predetermined value while the turn signal of the vehicle is flashing. When a characteristic behavior is not detected (NO in S4), the routine is repeated from step S1.

When a characteristic behavior is detected (YES in S4), the correction amount detection means 10*e* detects the positional information on the characteristic position 31 from the INS position, and detects the positional information on the node 22 that is closest to the characteristic position 31, from the map DB 13 (S5).

The position correction means 10f corrects the characteristic position 31 using the Kalman filter on the condition that the characteristic position 31 is close to the position of the node 22. Also, the position correction means 10f corrects the other INS positions and INS directions in the same manner as the manner in which the characteristic position 31 is corrected (S6).

Figure 5:
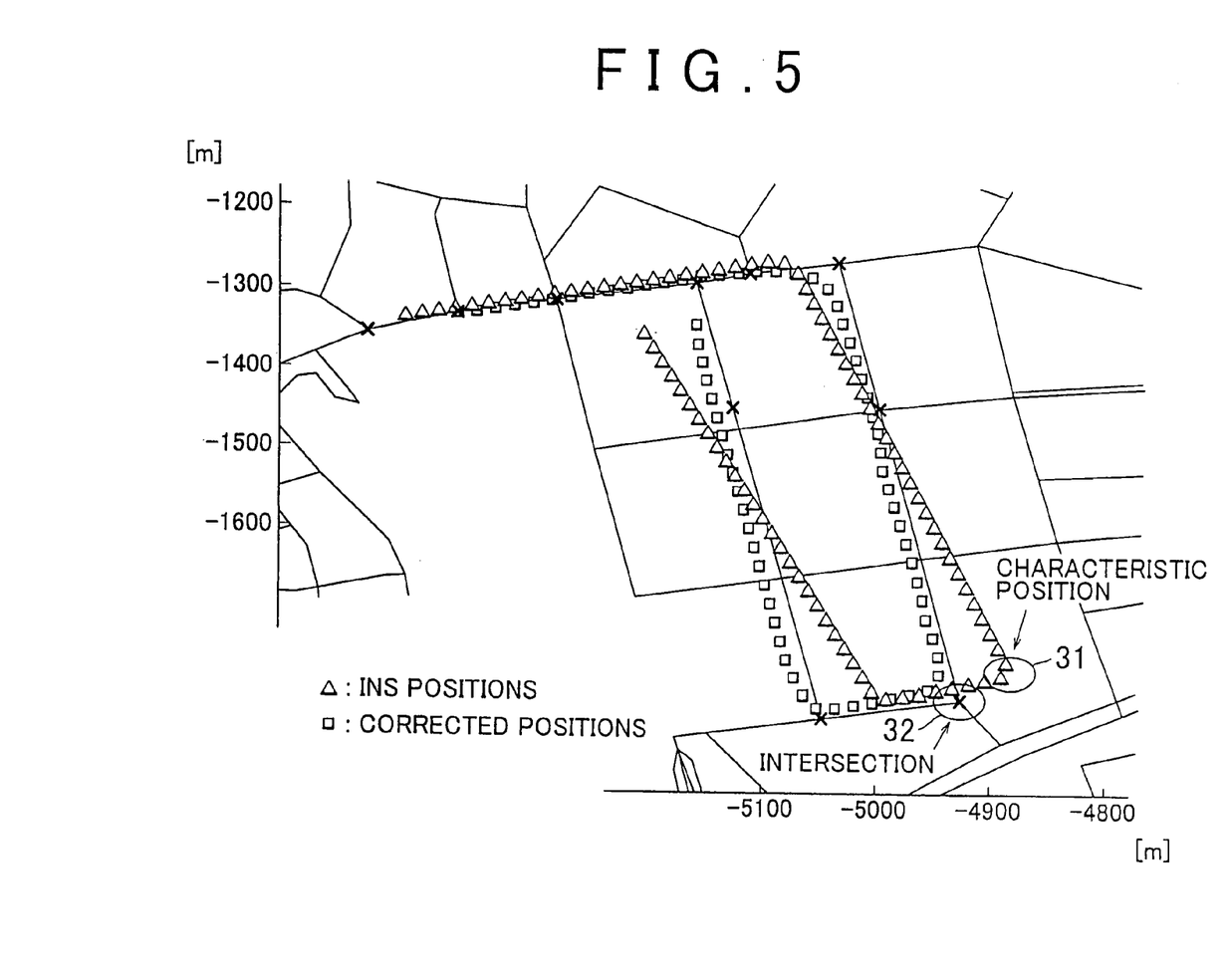
FIG. 5 is a diagram showing an actual result of position determination performed by the navigation apparatus.

FIG. 5 is a diagram showing an actual result of position determination performed by the navigation apparatus 1 according to the embodiment. FIG. 5 shows the result of the position determination performed when the GPS radio waves are blocked for approximately 350 seconds. The thin solid lines show the road configuration extracted from the map DB 13. The triangles show the INS positions. The squares show the positions of the host vehicle corrected based on the characteristic position.

The characteristic position 31 is detected from the INS position at which the host vehicle has exhibited a characteristic behavior. Accordingly, the correction amount detection means 10e extracts the positional information on an intersection 32 that is close to the characteristic position 31, from the map DB 13. Then, the position correction means 10f corrects the characteristic position 31 so that the characteristic position 31 is close to the intersection 32. Further, the position correction means 10f corrects the INS positions and INS directions ahead of, and behind the characteristic position 31 in the same manner as the manner in which the characteristic position 31 is corrected. Thus, as shown in FIG. 5, it is possible to accurately correct the INS positions, which deviate to a larger extent from the actual positions (for example, the road configuration in the map DB 13) as the time elapses.

The navigation apparatus 1 according to the embodiment corrects the INS positions and INS directions determined using autonomous navigation to the most probable positions and directions by making the correction so that the distance "d" between the position of the node 22 and the characteristic position 31 is zero using the Kalman filter, each time the host vehicle makes a turn to the right or left, or the like at an intersection.

The invention claimed is:

1. A navigation apparatus that detects a position of a movable body, comprising:
   a map data storage portion that stores map data;
   an autonomous sensor that detects behavior information of the movable body;
   a position-determination portion for determining whether radio waves for radio navigation are blocked;
   an inertial position determination portion that detects an inertial position-determination position of the movable body by accumulating the information detected by the autonomous sensor when the radio waves for radio navigation are blocked, the inertial position-determination position being a determined position of the movable body that is based on a result of position determination performed using radio navigation;
   a characteristic position detection portion that detects a characteristic position that is the inertial position-determination position at which the movable body has exhibited a characteristic behavior;
   a correction amount detection portion that extracts positional information of a road position corresponding to the characteristic position, by referring to the map data storage portion; and
   a position correction portion that corrects the characteristic position using a Kalman filter based on a condition that the characteristic position is close to the road position,
   wherein the characteristic behavior is a behavior in which a travel direction of the movable body is changed by a predetermined amount in a short time.

2. The navigation apparatus according to claim 1, wherein the position of the movable body is determined based on a radio wave from a GPS satellite in the radio navigation.

3. The navigation apparatus according to claim 1, wherein the map data storage portion stores information relating to a node and information relating to a link, which are associated with an actual road network.

4. The navigation apparatus according to claim 1, wherein the behavior information of the movable body includes a vehicle speed, a steering angle, and a travel direction.

5. The navigation apparatus according to claim 1, wherein the autonomous sensor is an INS device that outputs a signal in accordance with at least one of a travel distance of the movable body, a travel direction of the movable body, and an orientation of the movable body defined by yaw, roll, and pitch.

6. The navigation apparatus according to claim 1, wherein the movable body is a vehicle, and the characteristic position detection portion detects the characteristic behavior, when it is detected that a yaw rate of the vehicle is equal to or larger than a predetermined value while a direction indicator of the vehicle is operated.

7. The navigation apparatus according to claim 1, further comprising:
   a travel path detection portion for detecting a travel path of the movable body,
   wherein the characteristic position detection portion detects the characteristic behavior of the movable body, based on the travel path.

8. The navigation apparatus according to claim 1, wherein the correction amount detection portion extracts positional information of a node that is closest to the characteristic position, from the map data.

9. The navigation apparatus according to claim 1, wherein the position correction portion corrects the characteristic position so that a distance between the characteristic position and the road position is zero.

10. The navigation apparatus according to claim 1, wherein the position correction portion corrects the inertial position-determination positions ahead of, and behind the characteristic position by the same amount and in the same direction in which the characteristic position is corrected.

11. A method of correcting a detected position of a movable body, comprising:
   determining whether radio waves for radio navigation are blocked;
   detecting behavior information of the movable body when the radio waves for radio navigation are blocked;
   detecting an inertial position-determination position of the movable body by accumulating the behavior information when the radio waves for radio navigation are blocked, the inertial position-determination position being a determined position of the movable body that is based on a result of a position determination performed using radio navigation;
   detecting a characteristic position that is the inertial position-determination position at which the movable body has exhibited a characteristic behavior;
   extracting positional information of a road position corresponding to the characteristic position, by referring to a map data; and correcting with a computer the characteristic position using a Kalman filter based on a condition that the characteristic position is close to the road position;
wherein the characteristic behavior is a behavior in which a travel direction of the movable body is changed by a predetermined amount in a short time.

12. The method of claim 11, further comprising:
displaying the corrected characteristic position on a display.

* * * * *